US012047722B2

(12) United States Patent
Ricci

(10) Patent No.: US 12,047,722 B2
(45) Date of Patent: Jul. 23, 2024

(54) ELECTROACOUSTIC EARCUPS FOR OPEN-BACK HEADPHONES

(71) Applicant: Andrea Ricci, Volvera (IT)

(72) Inventor: Andrea Ricci, Volvera (IT)

( * ) Notice: Subject to any disclaimer, the term of this patent is extended or adjusted under 35 U.S.C. 154(b) by 833 days.

(21) Appl. No.: 17/053,031

(22) PCT Filed: May 3, 2019

(86) PCT No.: PCT/IB2019/053622
§ 371 (c)(1),
(2) Date: Nov. 4, 2020

(87) PCT Pub. No.: WO2019/211801
PCT Pub. Date: Nov. 7, 2019

(65) Prior Publication Data
US 2021/0235182 A1 Jul. 29, 2021

(30) Foreign Application Priority Data
May 4, 2018 (IT) ........................ 102018000005087

(51) Int. Cl.
*H04R 1/10* (2006.01)

(52) U.S. Cl.
CPC ......... *H04R 1/1008* (2013.01); *H04R 1/1075* (2013.01); *H04R 1/1083* (2013.01)

(58) Field of Classification Search
CPC ..... H04R 1/1008; H04R 1/075; H04R 1/1083
See application file for complete search history.

(56) References Cited

U.S. PATENT DOCUMENTS 5,497,427 A * 3/1996 Nageno ................ H04R 1/1066 381/381

FOREIGN PATENT DOCUMENTS

| | | | |
|---|---|---|---|
| CN | 206332803 | U | 7/2017 |
| FR | 2343388 | A1 | 9/1977 |
| JP | S6033291 | U | 3/1988 |

(Continued)

OTHER PUBLICATIONS

International Search Report and Written Opinion in corresponding International Application No. PCT/IB2019/053622 dated Aug. 2, 2019, 12 pages.

*Primary Examiner* — Andrew L Sniezek
(74) *Attorney, Agent, or Firm* — MH2 TECHNOLOGY LAW GROUP LLP

(57) ABSTRACT

An electroacoustic earcup for open-back headphones may include: a housing extending in a main direction, wherein the housing includes a first wall with a first opening and a second wall with a second opening, wherein the first and second walls are transverse to the main direction and are connected by a side wall; an air-permeable earpad whose shape mates with that of a human ear, wherein the air-permeable earpad is operably connected in fluid communication with the first opening; an air-permeable cover which is operably connected in fluid communication with the second opening; and a first electroacoustic transducer and a second electroacoustic transducer in the housing, one behind the other in the main direction. Each of the first and second electroacoustic transducers may include a diaphragm, configured to vibrate, facing the first opening. Each of the first and second electroacoustic transducers may define an input surface facing the second opening.

20 Claims, 4 Drawing Sheets

(56) References Cited

FOREIGN PATENT DOCUMENTS

| | | | | | |
|---|---|---|---|---|---|
| JP | 2009017485 | A | | 1/2009 | |
| WO | WO-2008132632 | A1 | * | 11/2008 | .............. A61F 11/08 |

* cited by examiner

ELECTROACOUSTIC EARCUPS FOR OPEN-BACK HEADPHONES

CROSS-REFERENCE TO RELATED APPLICATION(S)

This application is a national stage entry from International Application No. PCT/IB2019/053622, filed on May 3, 2019, in the Receiving Office ("RO/IB") of the International Bureau of the World Intellectual Property Organization ("WIPO"), and published as International Publication No. WO 2019/211801 A1 on Nov. 7, 2019; International Application No. PCT/IB2019/053622 claims priority from Italian Patent Application No. 102018000005087, filed on May 4, 2018, in the Italian Patent and Trademark Office ("IPTO"), the entire contents of all of which are incorporated herein by reference.

FIELD OF THE INVENTION

The present disclosure relates to an electroacoustic earcup for headphones, as defined in the preamble of claim 1 and to open-back headphones as claimed in claim 10.

In particular, the electroacoustic earcup comprises a pair of electroacoustic transducers both in fluid communication with the outside environment, and is configured for use with phones of the open-back type.

DISCUSSION OF THE RELATED ART

Electroacoustic earcups for open-back headphones are known to comprise a hollow housing having first and second openings in fluid communication with the outside environment. An air-permeable earpad is connected to the first opening and an air-permeable cover is connected to the second opening. An electroacoustic transducer is placed in the hollow housing and comprises a vibrating diaphragm to direct sound waves toward the ear of a listener.

Due to the air permeability of the earpad and the cover of the hollow housing, the vibrating diaphragm of the electroacoustic transducer can move within the hollow housing substantially as if it were in free air. Thus, the sounds from the environment and the sounds produced by the electroacoustic transducer can freely enter and exit the housing, for the listener to have a more natural perception of the reproduced sounds, similar to loudspeakers' hearing experience.

PRIOR ART PROBLEM

Sometimes, when receiving pulse signals, electroacoustic earcups having a single electroacoustic transducer for open-back headphones have a less than accurate sound response.

In particular, with pulse signals, the vibrating diaphragm will have too long acceleration and deceleration times to ensure high fidelity audio reproduction, possibly leading to an unpleasant listening experience.

SUMMARY OF THE INVENTION

The invention has the object of providing an electroacoustic earcup for open-back headphones that can solve the problems of the above discussed prior art.

Another object of the present invention is to provide open-back headphones comprising a pair of electroacoustic earcups.

These objects are fulfilled by an electroacoustic earcup for open-back headphones as defined in the independent claims 1 and 10 hereinbelow.

Advantages of the Invention

One embodiment can provide an electroacoustic earcup for open-back headphones that can improve sound reproduction as compared with known devices.

One embodiment can provide an electroacoustic earcup for open-back headphones with a vibrating diaphragm having much shorter acceleration and deceleration times than prior art headphones having a single electroacoustic transducer.

BRIEF DESCRIPTION OF THE DRAWINGS

The characteristics and advantages of the present disclosure will appear from the following detailed description of a possible practical embodiment, illustrated as a non-limiting example in the set of drawings, in which.

DETAILED DESCRIPTION

Even when this is not expressly stated, the individual features as described with reference to the particular embodiments shall be intended as auxiliary to and/or interchangeable with other features described with reference to other exemplary embodiments.

Figure 1:
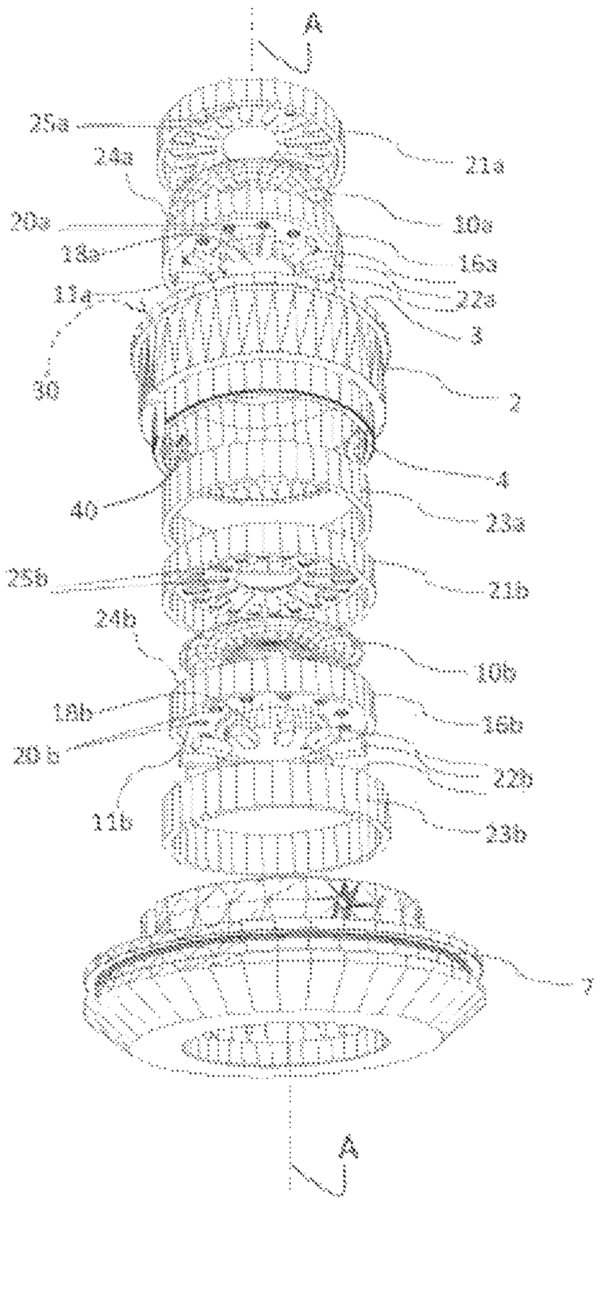
FIG. 1 shows an exploded view of the electroacoustic earcup.

Referring to the above figures and particularly to FIG. 1, numeral 2 designates the hollow housing 2 which acts as a support frame for the parts of the electroacoustic earcup 1.

This hollow housing 2 extends in a main direction A between first and second walls 3, 4 connected by a side wall 5. The first wall 3 has a first opening 30 and the second wall 4 has a second opening 40. The first and second openings 30, 40 are transverse to the main direction A.

Preferably, the first and second openings 30, 40 extend throughout the respective walls 3, 4, are perpendicular to the main direction A, and have the same size. Thus, the hollow housing 2 is open in the main direction A and is delimited by the side wall 5. Therefore, the hollow housing 2 preferably has a cylindrical shape.

The electroacoustic earcup 1 comprises an air-permeable earpad 6 whose shape mates with that of a human ear. Such earpad 6 is operably connected in fluid communication with the first opening 30 of the hollow housing 2. In operation, the earpad 6 rests on the ear of a listener and air freely flows from/to the hollow housing 2.

An air-permeable cover 7 is associated with the hollow housing 2. Such cover 7 is operably connected in fluid communication with the second opening 40 of the hollow housing 2. Thus, even with the cover, air freely flows from/to the hollow housing 2.

Figure 2:
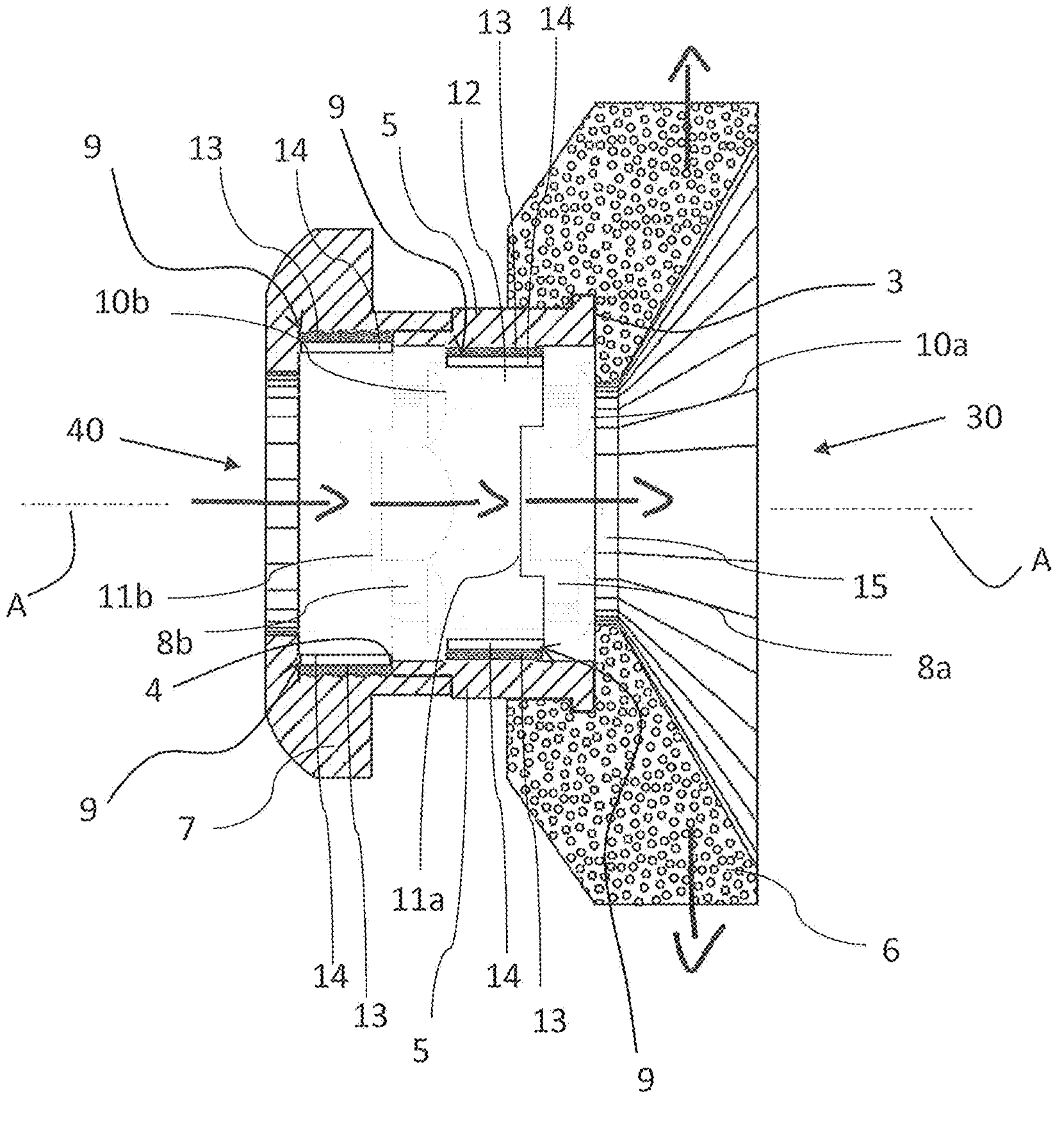
FIG. 2 shows a schematic view of the assembled electroacoustic earcup.
Figure 3:
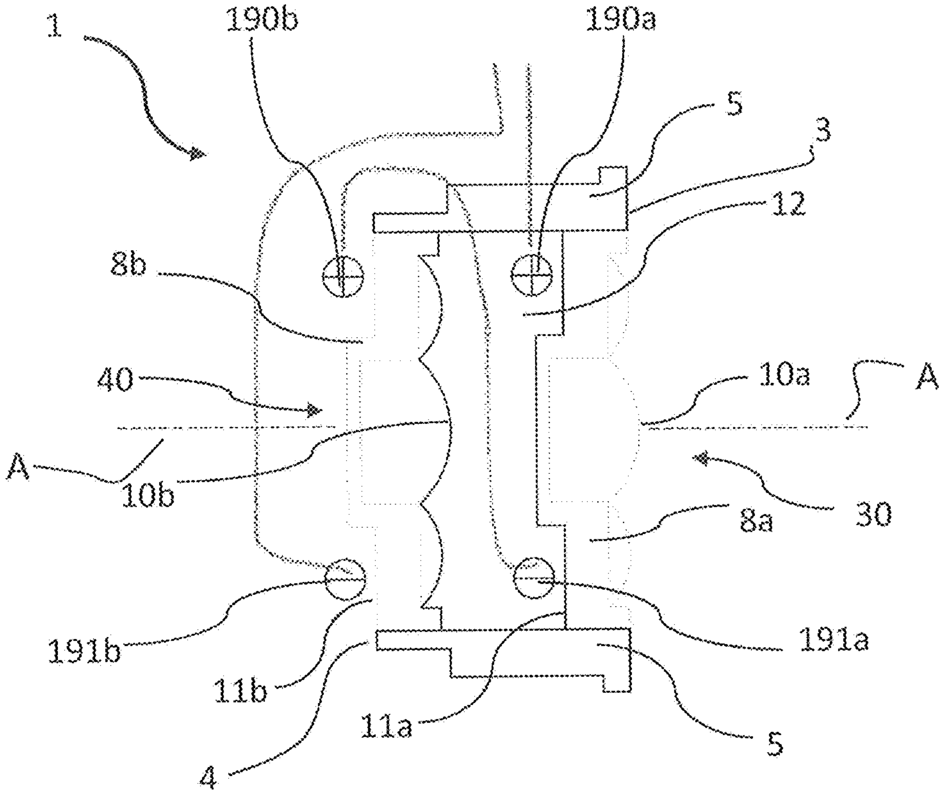
FIG. 3 shows a schematic of the electrical connections of the electroacoustic earcup.

Referring to FIGS. 1, 2 and 3, the electroacoustic earcup 1 comprises a first electroacoustic transducer 8*a* and a second electroacoustic transducer 8*b* which are adapted to convert an input electrical signal into an output acoustic signal. The first and second electroacoustic transducers 8*a*, 8b are arranged within the hollow housing 2 one behind the other in the main direction A.

In one aspect, also referring to the illustrated embodiment, the first electroacoustic transducer 8a is meant to be the transducer that is closer to the first opening 30 and the second electroacoustic transducer 8b is meant to be the transducer that is closer to the second opening 40.

Particularly, both electroacoustic transducers 8a, 8b comprise a vibrating diaphragm 10a, 10b that faces the first opening 30 of the hollow housing 2.

It shall be noted that both electroacoustic transducers 8a, 8b define an input surface 114, 11b that faces the second opening 40 of the hollow housing 2. Such input surface 11a, 11b of each electroacoustic transducer 8a, 8b is in fluid communication with its respective vibrating diaphragm 10a, 10b.

As this diaphragm 10a, 10b oscillates, it moves an air mass in front and/or on the back of the diaphragm 10a, 10b in the main direction A, thereby reproducing sound waves that propagate from within the hollow housing 2 to the outside toward the first and second openings 30, 40.

The first and second electroacoustic transducers 8a, 8b are hermetically connected by the side wall 5 of the hollow housing 2. In particular, the electroacoustic transducers 8a, 8b are peripherally connected to the side wall 5 in its surface that faces the hollow portion of the hollow housing 2. This connection peripherally seals each electroacoustic transducer 8a, 8b in the housing such that an isobaric chamber 12 will be defined between the two electroacoustic transducers 8a, 8b.

This isobaric chamber 12 is delimited, in the direction A, between the diaphragm 10b of second electroacoustic transducer 8b and the input surface 11a of the first electroacoustic transducer 8a and is laterally delimited by the side wall 5 of the hollow housing 2. Since the input surface 11a is in fluid communication with its respective diaphragm 10a, said isobaric chamber 12 substantially encloses an air mass under constant pressure between the diaphragm 10b of second electroacoustic transducer 8b and the diaphragm 10a of the first electroacoustic transducer 8a.

In particular, according to a preferred embodiment as shown in FIG. 1, the electroacoustic transducers 8a, 8b are magneto-dynamic full-range transducers.

Therefore, the electroacoustic transducers 8a and 8b comprise:

- a support base 16a, 16b,
- a covering body 21a, 21b,
- at least one permanent magnet 22a, 22b, preferably a plurality of permanent magnets 22a, 22b, A fixing body 23a, 23b, preferably a fixing ring 23a, 23b.

Each support base 16a, 16b extends between a support surface 24a, 24b and the input surface 11a, 11b.

Each support base 16a, 16b is arranged to be coaxial with the main direction A of the hollow housing 2 and preferably has a cylindrical shape.

Each support base 16a, 16b comprises a conductive plate 17a, 17b, a centrally-positioned coil 18a, 18b and a plurality of radially-positioned vent holes 20a, 20b extending from the input surface 11a, 11b to the support surface 24a, 24b.

The support base 16a, 16b comprises an electric circuit that has two contact poles, a positive pole 190a, 190b and a negative pole 191a, 191b.

The vibrating diaphragm 10a, 10b is connected to the support surface 24a, 24b via the coil 18a, 18b.

The plurality of permanent magnets 22a, 22b are radially positioned on the input surface 11a, 11b.

The covering body 21a, 21b has a plurality of openings 25a, 25b and its shape mates that of the support base 16a, 16b to be coupled therewith and to protectively cover the diaphragm 10a, 10b.

The fixing ring 23a, 23b is coupled to its respective support base 16a, 16b and connects it to the hollow housing 2 in the preferred position.

In a preferred embodiment, the first and second electroacoustic transducers 8a, 8b are coaxially arranged in the hollow housing 2.

Preferably, the first and second electroacoustic transducers 8a, 8b are electrically connected in series. In other words, referring to FIG. 3, the positive pole 190b of the second electroacoustic transducer 8b is electrically connected to the negative pole 191a of the first electroacoustic transducer 8a, and the current is delivered through electrical connections between an amplifier connected to the negative pole 191b of the second electroacoustic transducer 8b and to the positive pole 190a of first electroacoustic transducer 8a.

An electrical input signal propagates in the coil 18a, 18b immersed in a permanent magnetic field, causes it to oscillate and, as a result causes the diaphragm 10a, 10b to vibrate and reproduce audio signals.

Advantageously, the series connection of the two electroacoustic transducers 8a, 8b increases the power handling of the electroacoustic earcup 1 and limits the range of movement of the vibrating diaphragm 10a, 10b and, as a result, the possible distortions caused thereby.

It shall be noted that the coaxial arrangement of two electroacoustic transducers 8a, 8b placed one behind the other in the hollow housing 2, each in fluid communication with the outside environment of the hollow housing 2, causes both vibrating diaphragms 10a, 10b to move, thereby simulating free-air loading.

It shall be noted that the coaxial arrangement of the two electroacoustic transducers 8a, 8b, separated along the main direction A from the isobaric chamber 12, improves control of the movement of the vibrating diaphragms 10a, 10b. In particular, the diaphragm 10a of the first electroacoustic transducer 8a is not only guided by the movement of its respective coil 18a, but also by the synchronous movement of the diaphragm 10b of the second electroacoustic transducer 8b which pushes the pressurized air mass in the isobaric chamber 12.

Thus, the synchronous movement of the diaphragm 10b of the second electroacoustic transducer 8b facilitates air inflow and outflow through the first and second openings 30, 40 of the hollow housing 2 caused by the diaphragm 10a of the first electroacoustic transducer 8a and vice versa, which will greatly reduce the acceleration and deceleration times of the diaphragms 10a, 10b.

According to the distance between the two electroacoustic transducers 8a, 8b in the main direction A, an increased magnetic flux may be triggered between the magnets 22a, 22b of the first and second electroacoustic transducers 8a, 8b, which will afford improved control of the movement of the respective vibrating diaphragms 10a, 10b.

Preferably the distance between the vibrating diaphragm 10b of second electroacoustic transducer 8b and the input surface 11a of the first electroacoustic transducer 8a ranges from 5 mm to 20 mm, and is more preferably 13 mm to maximize the magnetic flux triggered between the two electroacoustic transducers 8a, 8b. Alternatively, this distance is 12 mm or 14 mm. The distance between the two electroacoustic transducers 8a, 8b is meant to be the minimum distance between the diaphragm 10b and the input surface 11a.

Referring to FIG. 2, it shall be noted that the electroacoustic earcup 1 comprises a lining made of a sound-proof material 9 associated with the side wall 5 of the hollow housing 2 and with the cover 7, on the surface that faces the hollow portion.

In particular, the lining made of sound-proof material 9 comprises a first layer of a sound-insulating material 13 and a second layer of a sound-absorbing material 14.

The first layer of sound-insulating material 13 is adapted to dampen the typical resonances and vibrations of typically selected materials. Preferably, the surface of the side wall 5 that faces the hollow portion of the hollow housing 2 is covered by the first layer of sound-insulating material 13 in the portion of the isobaric chamber 12. More preferably, the material of the first layer of sound-insulating material 13 is a Dynamat® Xtreme mat.

The second layer of sound-absorbing material 14 is adapted to dampen the reflections of the acoustic waves in the hollow housing 2, hence also in the isobaric chamber 12.

Preferably, the material of the second layer of sound-absorbing material 14 is a felt.

More in detail than in FIG. 2, it shall be noted that the earpad 6 is formed with an open-cell porous material that, when in resting upon an ear, allows the air to reversibly flow between the interior of the hollow housing 2 and the outside environment.

Preferably, the selected porous material has an pore-per-inch index, PPI ranging from 10 to 90 pores per inch, equivalent to a pore-per-millimeter value ranging from 0.4 to 3.6 pores per millimeter. More preferably the selected porous material has a PPI of 30 pores per inch, equivalent to 1.2 pores per millimeter. Preferably, the selected porous material is an open-cell polyurethane.

In a preferred embodiment, the earpad 6 comprises a central opening 15 at the first opening 30 of the hollow housing 2 with which it is operably connected. Thus, the diaphragm 10*a* of the first electroacoustic transducer 8*a* is capable of unimpeded emission of acoustic waves toward the ear of the user.

It shall be noted that the earpad 6 may be of circumaural type, i.e. completely encircling the ear of the user, or of supra-aural type, i.e. resting on the ear of the user.

According to a preferred embodiment, the air-permeable cover 7 that is coupled with the hollow housing 2 has a plurality of vent holes 26 at the second opening 40 with which it is operably connected.

Preferably the hollow housing 2 and the cover 7 are made of aluminum.

Figure 4:
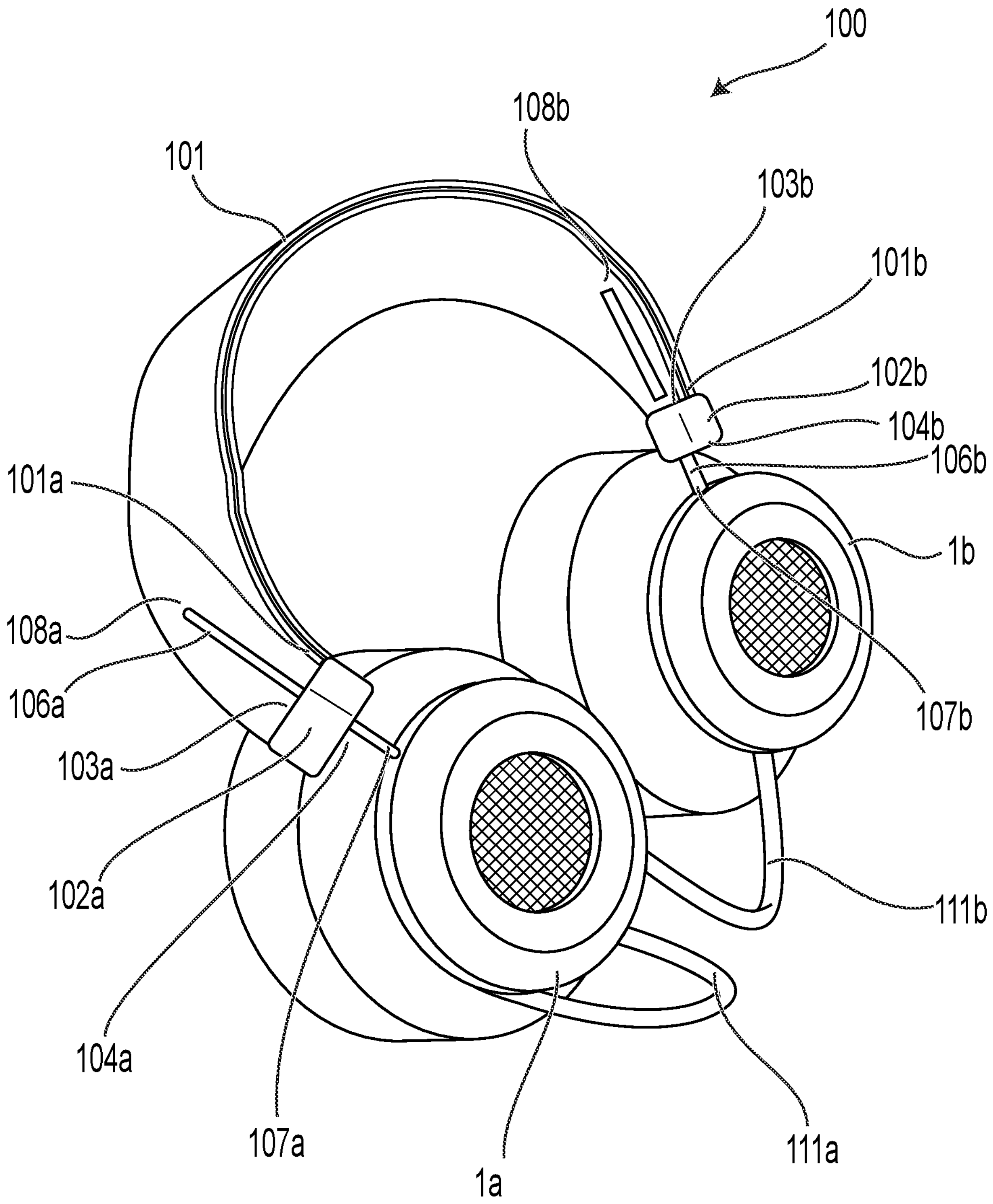
FIG. 4 shows a perspective view of open-back headphones with a pair of electroacoustic earcups of FIG. 2.

In a further aspect, also referring to FIG. 4, the present invention provides open-back headphones 100 comprising a pair of electroacoustic earcups 1*a*, 1*b* as described hereinabove.

The headphones 100 include a flexible headband 101 extending between a first end 101*a* and a second end 101*b* and formed to rest upon the head of a user. A first electroacoustic earcup 1*a* and a second electroacoustic earcup 1*b* are connected to the ends 101*a*, 101*b* of the flexible headband 101.

More in detail, the first and second ends 101*a*, 101*b* of the flexible headband 101 are connected to the first and second electroacoustic earcups 1*a*, 1*b* respectively via first and second adjustment members 102*a*, 102*b* for adjusting the position of each electroacoustic earcup 1*a*, 1*b* as needed by the user.

The adjustment members 102*a*, 102*b* can substantially adjust the positions of the electroacoustic earcups 1*a*, 1*b* between an extended position and a retracted position, i.e. can substantially adjust the length of the flexible headband 101

For this purpose, each adjustment member 102*a*, 102*b* has a box shape extending between a top wall 103*a*, 103*b* and a bottom wall 104*a*, 104*b* and has a through hole extending between the bottom wall 104*a*, 104*b* and the top wall 103*a*, 103*b*.

The top wall 103*a*, 103*b* of each adjustment member 102*a*, 102*b* is unremovably connected to its respective end 101*a*, 101*b* of the headband 101.

An adjustment rod 106*a*, 106*b* extends in the through hole of each adjustment member 102*a*, 102*b* between a lower end 107*a*, 107*b* and an upper end 108*b*, 108*a*. The lower end 107*a*, 107*b* of each adjustment rod 106*a*, 106*b* is unremovably connected to its respective electroacoustic earcup 1*a*, 1*b*.

With this arrangement, each adjustment member 102*a*, 102*b* can slide on its respective adjustment rod 106*a*, 106*b* between an extended position and a retracted position.

In the extended position, the upper end 108*b*, 108*a* of the adjustment rod 106*a*, 106*b* is held within the adjustment member 102*a*, 102*b*. Conversely, in the retracted position, the upper end 108*b*, 108*a* of the adjustment rod 106*a*, 106*b* is spaced apart from the top wall 103*a*, 103*b* of its respective adjustment member 102*a*, 102*b* and its respective electroacoustic earcup 1*a*, 1*b* rests on the bottom wall 104*a*, 104*b* of its respective adjustment member 102*a*, 102*b*.

It shall be noted that the headphones 100 comprise an electrical connection cable 109 having first and second terminal parts 110, 111. The first terminal part 110 is connected to an electrical connection element 112 adapted to be connected to an amplifier (not shown). The second terminal part 111 is connected to first and second cables 111*a*, 111*b*, respectively connected to the electric circuit of the first and second electroacoustic earcups 1*a*, 1*b*.

Those skilled in the art will obviously appreciate that a number of changes and variants as described above may be made to fulfill particular requirements, without departure from the scope of the invention, as defined in the following claims.

The invention claimed is:

1. An electroacoustic earcup for open-back headphones, the electroacoustic earcup comprising:

a hollow housing which extends in a main direction, wherein the hollow housing comprises a first wall with a first opening and a second wall with a second opening, wherein the first wall and the second wall are transverse to the main direction, and wherein the first wall and the second wall are connected by a side wall;

an air-permeable earpad whose shape mates with that of a human ear, wherein the air-permeable earpad is operably connected in fluid communication with the first opening of the hollow housing;

an air-permeable cover which is operably connected in fluid communication with the second opening of the hollow housing; and a first electroacoustic transducer and a second electroacoustic transducer arranged in the hollow housing, one behind the other in the main direction;

wherein the first electroacoustic transducer and the second electroacoustic transducer are electrically connected in series, wherein each of the first and second electroacoustic transducers comprises a vibrating diaphragm facing the first opening of the hollow housing, wherein each of the first and second electroacoustic transducers defines an input surface facing toward the second opening of the hollow housing, wherein the input surface of each of the first and second electroacoustic transducers is in fluid communication with a respective vibrating diaphragm, and wherein the first and second electroacoustic transducers are hermetically connected by the side wall of the hollow housing to define an isobaric chamber delimited between the vibrating diaphragm of the second electroacoustic transducer, the vibrating diaphragm of the first electroacoustic transducer, and the side wall of the hollow housing.

2. The electroacoustic earcup of claim 1, wherein the first electroacoustic transducer and the second electroacoustic transducer are coaxially arranged in the hollow housing.

3. The electroacoustic earcup of claim 1, wherein the first electroacoustic transducer and the second electroacoustic transducer are arranged so that a distance between the vibrating diaphragm of the second electroacoustic transducer and the input surface of the first electroacoustic transducer is greater than or equal to 5 millimeters (mm) and less than or equal to 20 mm.

4. The electroacoustic earcup of claim 1, further comprising:

a lining made of sound-proof material associated with the side wall of the hollow housing and with the air-permeable cover;

wherein the lining is on surfaces of the side wall and the air-permeable cover that face a hollow portion of the hollow housing.

5. The electroacoustic earcup of claim 4, wherein the lining made of the sound-proof material comprises a first layer of a sound-insulating material and a second layer of a sound-absorbing material.

6. The electroacoustic earcup of claim 4, wherein the lining made of the sound-proof material comprises sound-insulating material.

7. The electroacoustic earcup of claim 4, wherein the lining made of the sound-proof material comprises sound-absorbing material.

8. The electroacoustic earcup of claim 1, wherein the air-permeable earpad is formed with porous material having a pore-per-inch index (PPI) greater than or equal to 10 pores-per-inch and less than or equal to 90 pores-per-inch.

9. The electroacoustic earcup of claim 8, wherein the porous material is open-cell polyurethane.

10. The electroacoustic earcup of claim 1, wherein the air-permeable earpad comprises at least one central opening at the first opening of the hollow housing.

11. The electroacoustic earcup of claim 1, wherein the air-permeable cover comprises a plurality of vent holes at the second opening of the hollow housing.

12. Open-back headphones, comprising:

a flexible headband extending between a first end and a second end; and first and second electroacoustic earcups, each as recited in claim 1;

wherein the first electroacoustic earcup is connected to the first end, and wherein the second electroacoustic earcup is connected to the second end.

13. Open-back headphones, comprising:

first and second electroacoustic earcups, each as recited in claim 1.

14. The electroacoustic earcup of claim 1, wherein the first electroacoustic transducer and the second electroacoustic transducer are arranged so that a distance between the vibrating diaphragm of the second electroacoustic transducer and the input surface of the first electroacoustic transducer is 12 millimeters (mm), 13 mm, or 14 mm.

15. The electroacoustic earcup of claim 1, further comprising:

a lining made of sound-proof material associated with the side wall of the hollow housing;

wherein the lining is on a surface of the side wall that faces a hollow portion of the hollow housing.

16. The electroacoustic earcup of claim 1, further comprising:

a lining made of sound-proof material associated with the air-permeable cover;

wherein the lining is on a surface of the air-permeable cover that faces a hollow portion of the hollow housing.

17. The electroacoustic earcup of claim 1, wherein the air-permeable earpad is formed with porous material having a pore-per-inch index (PPI) equal to 30 pores-per-inch.

18. An electroacoustic earcup for open-back headphones, the electroacoustic earcup comprising:

a hollow housing which extends in a main direction, wherein the hollow housing comprises a first wall with a first opening and a second wall with a second opening, wherein the first wall and the second wall are transverse to the main direction, and wherein the first wall and the second wall are connected by a side wall;

an air-permeable earpad whose shape mates with that of a human ear, wherein the air-permeable earpad is operably connected in fluid communication with the first opening of the hollow housing;

an air-permeable cover which is operably connected in fluid communication with the second opening of the hollow housing; and a first electroacoustic transducer and a second electroacoustic transducer arranged in the hollow housing, one behind the other in the main direction;

wherein the first electroacoustic transducer and the second electroacoustic transducer are electrically connected in series, wherein each of the first and second electroacoustic transducers comprises a diaphragm, configured to vibrate, facing the first opening of the hollow housing, wherein each of the first and second electroacoustic transducers defines an input surface facing toward the second opening of the hollow housing, wherein the input surface of each of the first and second electroacoustic transducers is in fluid communication with a respective diaphragm, and wherein the first and second electroacoustic transducers are hermetically connected by the side wall of the hollow housing to define an isobaric chamber delimited between the diaphragm of the second electroacoustic transducer, the diaphragm of the first electroacoustic transducer, and the side wall of the hollow housing.

19. Open-back headphones, comprising:

first and second electroacoustic earcups, each as recited in claim 18.

20. An electroacoustic earcup for open-back headphones, the electroacoustic earcup comprising:

a hollow housing which extends in a main direction, wherein the hollow housing comprises a first wall with a first opening and a second wall with a second opening, wherein the first wall and the second wall are transverse to the main direction, and wherein the first wall and the second wall are connected by a side wall;

an air-permeable earpad whose shape mates with that of a human ear, wherein the air-permeable earpad is operably connected in fluid communication with the first opening of the hollow housing;

an air-permeable cover which is operably connected in fluid communication with the second opening of the hollow housing; and a first electroacoustic transducer and a second electroacoustic transducer arranged in the hollow housing, one behind the other in the main direction;

wherein each of the first and second electroacoustic transducers comprises a diaphragm, configured to vibrate, facing the first opening of the hollow housing, wherein each of the first and second electroacoustic transducers defines an input surface facing toward the second opening of the hollow housing, wherein the input surface of each of the first and second electroacoustic transducers is in fluid communication with a respective diaphragm, wherein the first and second electroacoustic transducers are hermetically connected by the side wall of the hollow housing to define an isobaric chamber delimited between the diaphragm of the second electroacoustic transducer, the diaphragm of the first electroacoustic transducer, and the side wall of the hollow housing, and wherein the first electroacoustic transducer and the second electroacoustic transducer are arranged so that a distance between the diaphragm of the second electroacoustic transducer and the input surface of the first electroacoustic transducer is greater than or equal to 5 millimeters (mm) and less than or equal to 20 mm.

* * * * *